US012682597B2

(12) United States Patent
Li et al.

(10) Patent No.: US 12,682,597 B2
(45) Date of Patent: Jul. 14, 2026

(54) VIDEO SIMILARITY DETECTION METHOD, APPARATUS, AND DEVICE

(71) Applicant: HUAWEI TECHNOLOGIES CO., LTD., Guangdong (CN)

(72) Inventors: Jun Li, Beijing (CN); Haomiao Liu, Shenzhen (CN); Weimeng Gong, Shenzhen (CN); Dandan Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 17/568,705

(22) Filed: Jan. 4, 2022

(65) Prior Publication Data

US 2022/0172476 A1      Jun. 2, 2022

Related U.S. Application Data

(63) Continuation of application No. PCT/CN2019/096515, filed on Jul. 18, 2019.

(51) Int. Cl.
| | |
|---|---|
| *G06V 20/40* | (2022.01) |
| *G06N 3/04* | (2023.01) |
| *G06V 10/44* | (2022.01) |
| *G06V 10/75* | (2022.01) |
| *G06V 10/82* | (2022.01) |
| *H04N 5/262* | (2006.01) |
| *H04N 5/278* | (2006.01) |

(52) U.S. Cl.
CPC ............. *G06V 10/454* (2022.01); *G06N 3/04* (2013.01); *G06V 10/757* (2022.01); *G06V 10/82* (2022.01); *G06V 20/41* (2022.01);

*G06V 20/46* (2022.01); *G06V 20/48* (2022.01); *H04N 5/2628* (2013.01); *H04N 5/278* (2013.01)

(58) Field of Classification Search
CPC ...... G06V 10/454; G06V 20/46; G06V 10/82; G06V 20/41; G06V 10/757; G06V 20/48; G06N 3/04; H04N 5/2628; H04N 5/278
USPC ........................................................ 386/278
See application file for complete search history.

(56) References Cited

U.S. PATENT DOCUMENTS

| | | | |
|---|---|---|---|
| 2009/0263014 A1 | 10/2009 | Zhang et al. | |
| 2017/0140541 A1* | 5/2017 | Lu ..................... | H04N 21/23418 |
| 2017/0220854 A1* | 8/2017 | Yang ..................... | G06V 20/46 |

(Continued)

FOREIGN PATENT DOCUMENTS

| | | |
|---|---|---|
| CN | 101315631 A | 12/2008 |
| CN | 102800095 A | 11/2012 |
| CN | 103257992 A | 8/2013 |

(Continued)

*Primary Examiner* — Thai Q Tran
*Assistant Examiner* — Nienru Yang

(57) ABSTRACT

A video similarity detection method and apparatus are provided. In the method, a detection apparatus receives a first video, determines a key frame of the first video based on the first video, and determines a similar key frame and a second video, the similar key frame being determined based on the key frame. The second video includes a video in which the similar key frame is located. The method inputs the key frame and the similar key frame to an editing type recognition model to obtain an editing type. The editing type indicates an editing type used for editing between the first video and the second video.

15 Claims, 11 Drawing Sheets

(56)                    References Cited

U.S. PATENT DOCUMENTS

| | | | | |
|---|---|---|---|---|
| 2018/0082127 A1* | 3/2018 | Carlson | ............... | G06F 18/2323 |
| 2018/0137892 A1* | 5/2018 | Ding | .................... | G11B 27/031 |

FOREIGN PATENT DOCUMENTS

| | | | | |
|---|---|---|---|---|
| CN | 103747254 A | 4/2014 | | |
| CN | 103747255 A | 4/2014 | | |
| CN | 103747271 A | 4/2014 | | |
| CN | 105809174 A | 7/2016 | | |
| CN | 106060568 A | 10/2016 | | |
| CN | 106097379 A | 11/2016 | | |
| CN | 106778686 A | 5/2017 | | |
| CN | 107221022 A | 9/2017 | | |
| CN | 109189991 A | 1/2019 | | |
| CN | 109492129 A | 3/2019 | | |
| CN | 106682108 B * | 7/2022 | ........... | G06F 16/783 |
| WO | 9834181 A2 | 8/1998 | | |

* cited by examiner

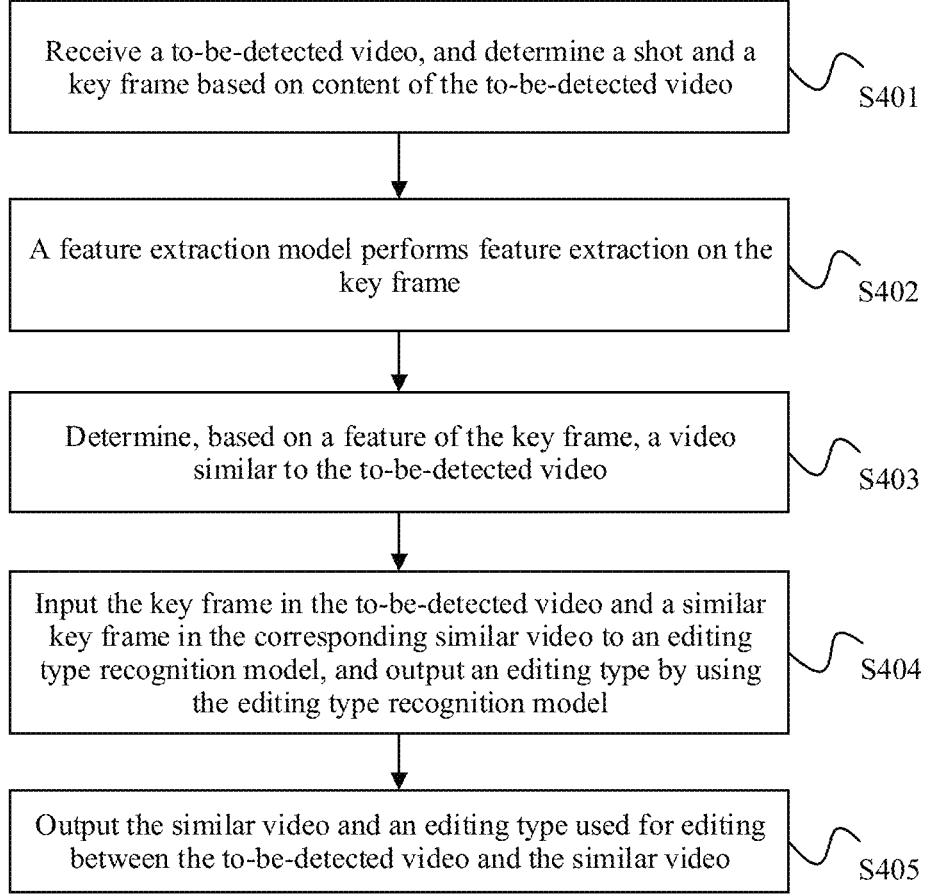

Receive a to-be-detected video, and determine a shot and a key frame based on content of the to-be-detected video    S401

A feature extraction model performs feature extraction on the key frame    S402

Determine, based on a feature of the key frame, a video similar to the to-be-detected video    S403

Input the key frame in the to-be-detected video and a similar key frame in the corresponding similar video to an editing type recognition model, and output an editing type by using the editing type recognition model    S404

Output the similar video and an editing type used for editing between the to-be-detected video and the similar video    S405

FIG. 6

```
To-be-detected video Q,
List of top-K similar videos:
[
   [
    Similar video name R1,
    Overall similarity XX.XX%,
    List of similar shots:
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
        ...
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
    List of overall editing types:
        [Type 1: confidence, type 2: confidence, ...]
   ],
   [
    Similar video name R2,
    Overall similarity: XX.XX%,
    List of similar shots:
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
        ...
        [Start time or a frame sequence number in the video Q, end time or a frame sequence
number in the video Q, start time or a frame sequence number in a source video, end time or a
frame sequence number in the source video, duration or a frame quantity of the shot, shot
similarity xx.xx%, shot editing type list: [type 1: confidence, type 2: confidence, ...]],
    List of overall editing types:
        [Type 1: confidence, type 2: confidence, ...]
   ],
   ...
]
```

FIG. 9

VIDEO SIMILARITY DETECTION METHOD, APPARATUS, AND DEVICE

CROSS-REFERENCE TO RELATED APPLICATIONS

This application is a continuation of International Application No. PCT/CN2019/096515, filed on Jul. 18, 2019. The disclosure of the aforementioned application is hereby incorporated by reference in their entireties.

TECHNICAL FIELD

This application relates to the field of artificial intelligence, and in particular, to a video similarity detection method, and an apparatus and a device for performing the method.

BACKGROUND

With rapid development of the mobile Internet and popularization of smart terminals, video production, transmission, and consumption are everywhere in people's life. Various video-based production, consumption, and learning applications and platforms are emerging, such as applications and platforms for financial communication, online education, short videos, and entertainment variety programs. Conventional digital video processing software (for example, Corel VideoStudio), video transcoding tools (for example, Format Factory), and hot artificial intelligence technologies (for example, a generative adversarial network) make video editing easy and convenient. There is a plurality of editing types for video editing, including cropping, stitching, rotating, mirroring, blurring, text adding/removing, icon adding/removing, color/brightness/contrast changing, scaling, border adding/removing, filter adding, and the like. An edited video may enter a transmission chain again.

Editing an existing video to obtain a plurality of videos with different styles enriches diversity and entertainment of video content, but brings a greater challenge to video information security. For a video obtained after various types of editing operations are performed on one or more existing videos, how to perform similarity detection on the edited video and the existing videos to obtain a specific overlapping area and how to recognize a used editing type are critical to video-related services such as copyright authentication and advertisement recognition through video similarity query.

There is a conventional technology for video similarity detection. For example, 1. An adaptive threshold is set based on a correlation between mode noise distribution of a to-be-detected video and a video similar to the to-be-detected video, and similarity detection and positioning are performed on the video based on the adaptive threshold. 2. A similarity between the to-be-detected video and an existing video is calculated based on a hash algorithm. 3. Global features and local features of frames at a fixed interval in the videos are compared to obtain a location of an edited or tampered region. However, in the conventional technology, only whether the video is obtained by editing one or more existing videos can be determined, but a specific type of editing operation that is performed on the one or more existing videos to obtain the to-be-detected video cannot be determined. Therefore, how to determine the video similar to the to-be-detected video and detect the type of editing performed on the to-be-detected video compared with the similar video is an urgent to-be-resolved technical problem for video similarity detection.

SUMMARY

This application provides a video similarity detection method. In the method, a video similar to a to-be-detected video may be determined, and a type of editing used in the to-be-detected video compared with the similar video may further be determined.

According to a first aspect, this application provides a video similarity detection method. The method includes: receiving a first video, and determining a key frame of the first video based on the first video; inputting the key frame to a feature extraction model to obtain a feature of the key frame; determining a similar key frame and a second video based on the feature of the key frame, where the second video is a video in which the similar key frame is located, and the second video is similar to the first video; and inputting the key frame and the similar key frame to an editing type recognition model to obtain an editing type, where the editing type indicates an editing type used for editing between the first video and the second video. According to the video similarity detection method provided in this aspect, not only a similar video corresponding to a to-be-detected video is determined, but a type of editing performed on the to-be-detected video compared with the similar video is further obtained based on determining the similar video. This makes this method more advantageous in applications such as video copyright authentication and advertisement recognition.

In an embodiment of the first aspect, the method further includes: outputting the second video or information about the second video to a display module, where the information about the second video includes a name of the second video; and outputting the editing type to the display module. The video similar to the to-be-detected video and the type of editing performed on the to-be-detected video compared with the similar video are visually displayed by using the display module, so that a user can intuitively obtain the information.

In an embodiment of the first aspect, the editing type recognition model includes a first feature extraction branch, a second feature extraction branch, and a predictor. The inputting the key frame and the similar key frame to an editing type recognition model to obtain an editing type includes: inputting the key frame to the first feature extraction branch, and inputting the similar key frame to the second feature extraction branch; performing, by the first feature extraction branch, feature extraction on the key frame, and outputting an editing feature of the key frame; performing, by the second feature extraction branch, feature extraction on the similar key frame, and outputting an editing feature of the similar key frame; and inputting the editing feature of the key frame and the editing feature of the similar key frame to the predictor, and outputting, by the predictor, the editing type. In this method, an editing type recognition module including feature extraction branches and a predictor is used, so that accuracy of an obtained editing type is high.

In an embodiment of the first aspect, the method further includes: calculating a similarity between the first video and the second video, and outputting the similarity to the display module. The method provides similarity information, and enriches detection results about the to-be-detected video. These results may be used by the user or another module.

In an embodiment of the first aspect, the determining a similar key frame and a second video based on the feature of the key frame includes: querying a video library based on the feature of the key frame to obtain the similar key frame from the video library, where a feature of the similar key frame is similar to the feature of the key frame; and determining the second video based on the similar key frame. This manner of determining the similar video from a perspective of determining the similar key frame improves accuracy of video similarity detection.

In an embodiment of the first aspect, the feature extraction model and the editing type recognition model are separately different based on neural network models. Both the feature extraction model and the editing type recognition model are trained neural network models, so that efficiency of the video similarity detection in this application is high, and accuracy of an obtained detection result is high.

In an embodiment of the first aspect, the editing type includes one or more of the following operations: cropping, stitching, rotating, mirroring, blurring, text adding, icon adding, color changing, brightness changing, and contrast changing.

In an embodiment of the first aspect, the method further includes: determining a similar shot in the similar video based on the similar key frame, where the similar shot is a shot similar to a shot in which the key frame is located; and outputting, to the display module, a correspondence between the similar shot and the shot in which the key frame is located. According to the method, the correspondence between the similar shot and the shot in which the key frame is located may further be accurately output, so that results of video similarity detection are richer, and the user can make further planning based on the detection results.

In an embodiment of the first aspect, the editing type may alternatively be an editing type used for editing between the similar shot and the shot in which the key frame is located.

In an embodiment of the first aspect, the similarity between the video and the similar video further includes a similarity between a shot in the video and a similar shot in the corresponding similar video.

In an embodiment of the first aspect, the determining a key frame of the video based on the first video includes: performing structure analysis on the video based on content of the video, to obtain a shot of the video, where the shot is a set of video frames, in the video, that represent a piece of image content having a continuous background; and determining the key frame in the shot, where the key frame is a video frame representing main image content of the shot.

According to a second aspect, this application provides a detection apparatus, including: a structure analysis module, configured to receive a first video, and determine a key frame of the first video based on the first video; a feature extraction model, configured to obtain a feature of the key frame based on the key frame; a comparison analysis module, configured to determine a similar key frame and a second video based on the feature of the key frame, where the second video is a video in which the similar key frame is located, and the second video is similar to the first video; and an editing type recognition model, configured to obtain an editing type based on the key frame and the similar key frame, where the editing type indicates an editing type used for editing between the first video and the second video.

In an embodiment of the second aspect, the detection apparatus further includes an output module, configured to: output the second video or information about the second video to a display module, where the information about the second video includes a name of the second video; and output the editing type to the display module.

In an embodiment of the second aspect, the editing type recognition model includes a first feature extraction branch, a second feature extraction branch, and a predictor. The first feature extraction branch is configured to: receive the key frame, perform feature extraction on the key frame, and output an editing feature of the key frame. The second feature extraction branch is configured to: receive the similar key frame, perform feature extraction on the similar key frame, and output an editing feature of the similar key frame. The predictor is configured to obtain the editing type based on the editing feature of the key frame and the editing feature of the similar key frame.

an embodiment of the second aspect, the comparison analysis module is further configured to calculate a similarity between the first video and the second video, and the output module is further configured to output the similarity to the display module.

In an embodiment of the second aspect, the structure analysis module is configured to: query a video library based on the feature of the key frame to obtain the similar key frame from the video library, where a feature of the similar key frame is similar to the feature of the key frame; and determine the second video based on the similar key frame.

In an embodiment of the second aspect, the feature extraction model and the editing type recognition model are separately different based on neural network models.

In an embodiment of the second aspect, the editing type includes one or more of the following operations: cropping, stitching, rotating, mirroring, blurring, text adding, icon adding, color changing, brightness changing, and contrast changing.

In an embodiment of the second aspect, the comparison analysis module is further configured to determine a similar shot in the similar video based on the similar key frame, where the similar shot is a shot similar to a shot in which the key frame is located; and the output module is further configured to output, to the display module, a correspondence between the similar shot and the shot in which the key frame is located.

In an embodiment of the second aspect, the editing type may alternatively be an editing type used for editing between the similar shot and the shot in which the key frame is located.

In an embodiment of the second aspect, the similarity between the video and the similar video further includes a similarity between a shot in the video and a similar shot in the corresponding similar video.

In an embodiment of the second aspect, the structure analysis module is configured to: perform structure analysis on the video based on content of the video, to obtain a shot of the video, where the shot is a set of video frames, in the video, that represent a piece of image content having a continuous background; and determine the key frame in the shot, where the key frame is a video frame representing main image content of the shot.

According to a third aspect, this application provides a computing device system, including at least one computing device. Each computing device includes a memory and a processor. The memory of the at least one computing device is configured to store computer instructions. The processor of the at least one computing device executes the computer instructions stored in the memory, to perform the method provided in any one of the first aspect or the embodiments of the first aspect.

According to a fourth aspect, this application provides a non-transitory readable storage medium. When the non-transitory readable storage medium is executed by a computing device, the computing device performs the method provided in any one of the first aspect or the embodiments of the first aspect. The storage medium stores a program. The storage medium includes but is not limited to a volatile memory, for example, a random access memory or a non-volatile memory, for example, a flash memory, a hard disk drive (HDD for short), or a solid-state drive (SSD for short).

According to a fifth aspect, this application provides a computer program product. The computer program product includes computer instructions. When the computer instructions are executed by a computing device, the computing device performs the method provided in any one of the first aspect or the embodiments of the first aspect. The computer program product may be a software installation package. When the method provided in any one of the first aspect or the embodiments of the first aspect needs to be used, the computer program product may be downloaded to and executed on the computing device.

BRIEF DESCRIPTION OF DRAWINGS

To describe the technical methods in the embodiments of this application more clearly, the following briefly describes the accompanying drawings for the embodiments.

FIG. 6 is a flowchart of a video similarity detection method according to an embodiment of this application;

FIG. 9 is a diagram of displaying, in a form of a text, information output by a detection apparatus according to an embodiment of this application;

DESCRIPTION OF EMBODIMENTS

The following describes the solutions in the embodiments provided in this application with reference to the accompanying drawings in this application.

Figure 1:
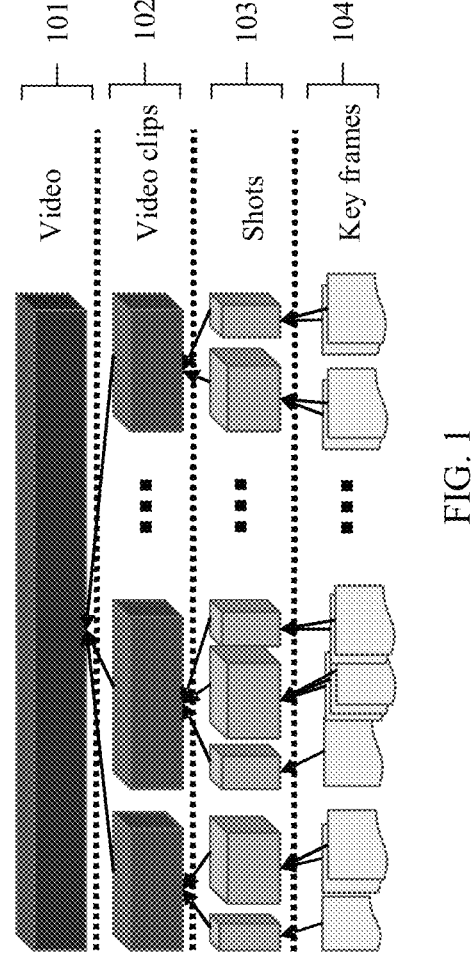
FIG. 1 is a diagram of a relationship between a video, a video clip, a shot, and a key frame according to an embodiment of this application.

A video is an electrical signal that stores images occurring continuously in the real world. FIG. 1 is a diagram of a relationship 100 between a video 101, a video clip 102, a shot 103, and a key frame 104. A video 101 may be divided into a plurality of video clips 102 based on content of images of the video 101, and each video clip 102 records video content of a relatively complete plot. A video clip 102 may further be divided into a plurality of shots 103, and video content in each shot 103 is images, shot by a camera at a time, that have a continuous background. A shot 103 includes one or more video frames 104, and each video frame 104 is an independent image. In a shot 103, a video frame 104 that can describe main content of the current shot 103 is referred to as a key frame 104 of the shot 103, and the shot may have one or more key frames 104. A key frame 104 in a shot 103 may be determined by using a plurality of methods, so that content of the shot 103 may be represented by content in the key frame 104. It can be learned from FIG. 1 that a video 101 may be divided into a plurality of levels, and a minimum unit of the video 101 is a video frame 104. Therefore, in other words, one or more video frames 104 (including key frames 104) form a shot 103, shots 103 of different scenes form a video clip 102, and one or more video clips 1024 form a complete video 101. A relationship between a video 101 and corresponding video clip 102, shot 103, and key frame 104 is referred to as a multi-level structure of the video 101, and multi-level structure analysis may be performed on the video 101 based on content of the video 101.

This application provides a video similarity detection method. In the method, a video is analyzed and detected based on a multi-level structure of the video, to obtain a result of whether the to-be-detected video is similar to a video in a video library. When the video is similar to one or more other videos, location information of a clip in the video and a similar clip in the similar video and an editing type of a shot of the video relative to a shot of the similar video, for example, cropping, stitching, rotating, mirroring, blurring, text adding, icon adding, color changing, brightness changing, or contrast changing, may further be obtained.

It should be noted that, in the embodiments of this application, two videos being similar means that one or more similar key frames are included in the two videos. One or more key frames included in either of the two videos are obtained by editing one or more key frames included in the other video by using one or more types of editing means. For example, all key frames in a first video clip of a video A are obtained by adding subtitles to key frames in a video B, and key frames in a $(2-N)^{th}$ video clip in the video A (where N is a positive integer greater than or equal to 1) are obtained by removing icons from some key frames in a video C. In this case, the video B and the video C are considered as similar videos of the video A. In other words, the video A is similar to the video B, and the video A is also similar to the video C.

An embodiment of this application provides a video similarity detection method, and the method is executed by a detection apparatus. Deployment of the detection apparatus is relatively flexible.

Figure 2:
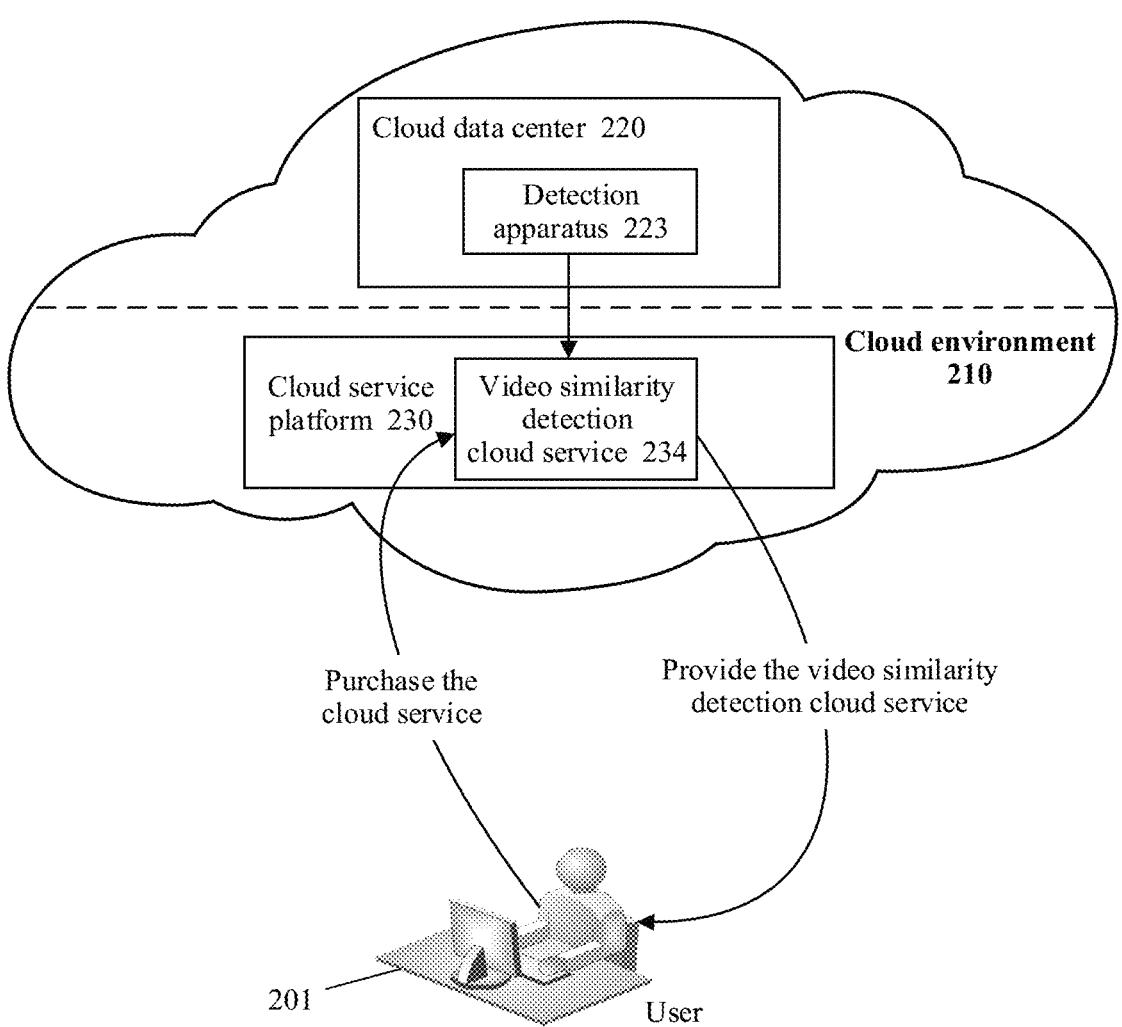
FIG. 2 is a deployment diagram of a detection apparatus according to an embodiment of this application.

FIG. 2 is a deployment diagram of a detection apparatus 223 according to an embodiment of this application. The detection apparatus 223 may be deployed in a cloud environment 210, and the cloud environment 210 is an entity that provides a cloud service for a user 201 by using basic resources in a cloud computing mode. The cloud environment 210 includes a cloud data center 220 and a cloud service platform 230. The cloud data center 220 includes a large quantity of basic resources (including compute resources, storage resources, and network resources) owned by a cloud service provider. The compute resources included in the cloud data center 220 may be a large quantity of computing devices (for example, servers). The detection apparatus 223 may be a server configured to detect a video in the cloud data center 220. Alternatively, the detection apparatus 223 may be a virtual machine that is created in the cloud data center 220 and configured to detect a video. Alternatively, the detection apparatus 223 may be a software apparatus deployed on a server or a virtual machine in the cloud data center 220, and the software apparatus is configured to detect a video. The software apparatus may be deployed, in a distributed manner, on a plurality of servers, a plurality of virtual machines, or a virtual machine and a server. As shown in FIG. 2, the detection apparatus 223 is abstracted by the cloud service provider into a video similarity detection cloud service 234 on the cloud service platform 230 and provided to a user. After the user 201 purchases the cloud service on the cloud service platform 230, the cloud environment 210 provides the video similarity detection cloud service 234 for the user 201 by using the detection apparatus 223. The user 201 may upload a to-be-detected video to the cloud environment 210 through an application programming interface (API) or a web page interface provided by the cloud service platform 230. The detection apparatus 223 receives the to-be-detected video, and detects the to-be-detected video. A detection result is returned by the detection apparatus 223 to a terminal on which the user 201 is located. Alternatively, the detection result is stored in the cloud environment 210. For example, the detection result is presented on the web page interface of the cloud service platform 230 for viewing by the user 201.

Figure 3:
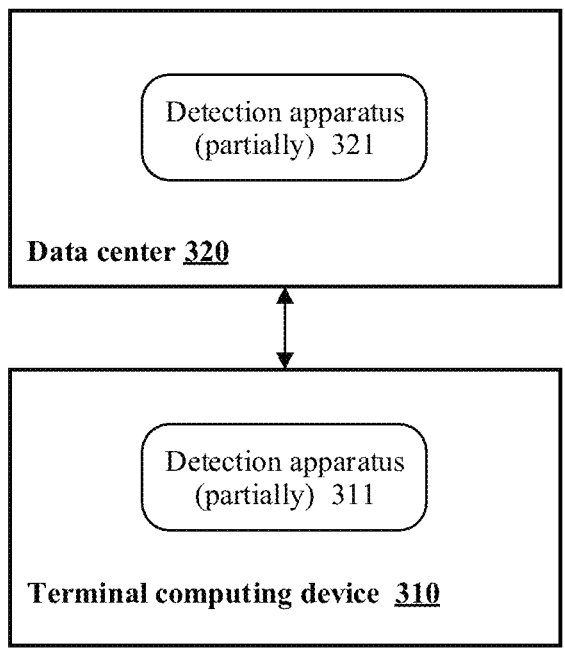
FIG. 3 is a deployment diagram of another detection apparatus according to an embodiment of this application.

When the detection apparatus is a software apparatus, the detection apparatus may be logically divided into a plurality of parts, and each part has a different function (for example, the detection apparatus includes a structure analysis module, a feature extraction model, a comparison analysis module, an editing type recognition model, and an output module). Several parts of the detection apparatus may be separately deployed in different environments or on different devices. For example, as shown in FIG. 3, a part of the detection apparatus 311 is deployed on a terminal computing device 310 (for example, a terminal server, a smartphone, a laptop, a tablet, a personal desktop computer, or a smart camera), and another part 321 is deployed in a data center 320 (deployed on a server or a virtual machine in the data center). The data center 320 may be the cloud data center, or the data center may be an edge data center. The edge data center is a set of edge computing devices deployed close to the terminal computing device.

The parts of the detection apparatus that are deployed in different environments or on different devices collaborate to implement a video editing type detection function. For example, in a scenario, the structure analysis module in the detection apparatus is deployed on the smartphone. The smartphone obtains a video, and performs structure analysis on the video by using the structure analysis module. The smartphone sends data obtained after the structure analysis to the data center through a network. The feature extraction model, the comparison analysis module, the editing type recognition model, and the output module are deployed in the data center. These modules/models further process the data obtained after the structure analysis to finally obtain a detection result. The data center sends the detection result to the smartphone. In this way, a user using the smartphone can obtain the detection result of the video. It should be understood that this application does not limit which part of the detection apparatus is deployed on the terminal computing device and which part is deployed in the data center. In an actual application, adaptive deployment may be performed based on a computing capability or a specific application requirement of the terminal computing device. It should be noted that, in an embodiment, the detection apparatus may alternatively be deployed in three parts: One part is deployed on the terminal computing device, one part is deployed in the edge data center, and one part is deployed in the cloud data center.

Figure 4:
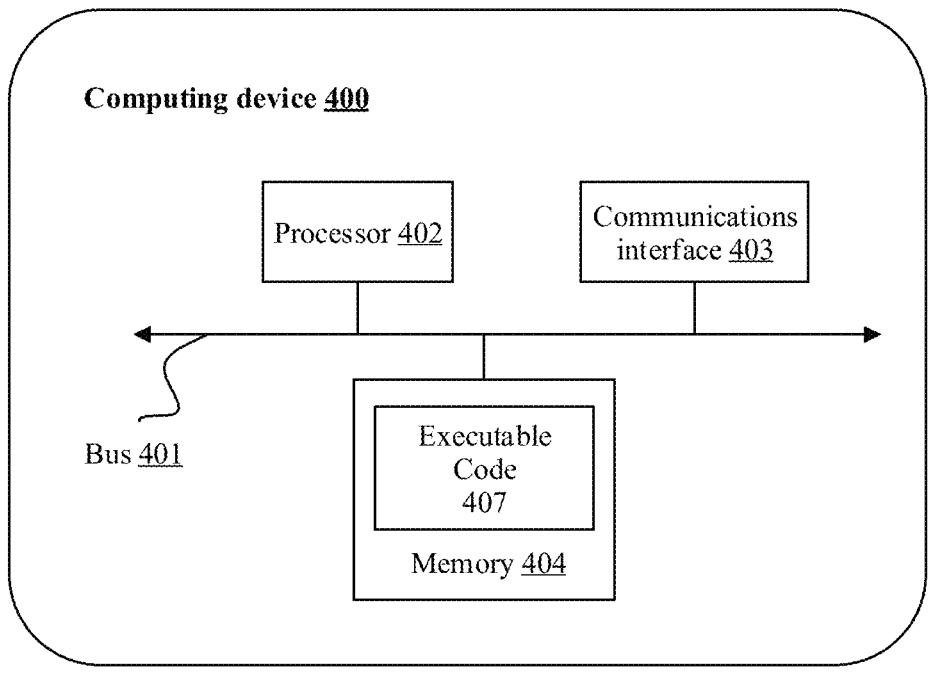
FIG. 4 is a diagram of a computing device on which a detection apparatus is deployed according to an embodiment of this application.

When the detection apparatus is a software apparatus, the detection apparatus may alternatively be independently deployed on a computing device in any environment (for example, independently deployed on a terminal computing device or independently deployed on a computing device in a data center). As shown in FIG. 4, a computing device 400 includes a bus 401, a processor 402, a communications interface 403, and a memory 404. The processor 402, the memory 404, and the communications interface 403 communicate with each other through the bus 401. The processor 402 may be a central processing unit (CPU for short). The memory 404 may include a volatile memory, for example, a random access memory (RAM). The memory 404 may further include a non-volatile memory (NVM), for example, a read-only memory (ROM), a flash memory, an HDD, or an SSD. The memory 404 stores executable code 407 included in the detection apparatus, and the processor 402 reads the executable code 407 in the memory 404 to perform the video similarity detection method. The memory 404 may further include another software module, for example, an operating system, for running a process. The operating system may be Linux™, Unix™, Windows™, or the like.

When the detection apparatus performs the video similarity detection method provided in this embodiment of this application, a neural network model needs to be used. The neural network model is a mathematical calculation model that simulates a structure and a function of a biological neural network (a central nervous system of an animal). A neural network model may include a plurality of neural network layers with different functions, and each layer includes a parameter and a calculation formula. According to different calculation formulas or different functions, different layers in the neural network model have different names. For example, a layer on which convolution calculation is performed is referred to as a convolutional layer, and the convolutional layer is usually used to perform feature extraction on an input signal (for example, an image). A neural network model may alternatively be formed by combining a plurality of existing neural network models. Neural network models with different structures may be used in different scenarios (for example, classification or recognition) or provide different effects when being used in a same scenario. The structures of the neural network models being different includes one or more of the following: different quantities of network layers in the neural network models, different sequences of the network layers, or different weights, parameters, or calculation formulas at each network layer. There is a plurality of different neural network models with relatively high accuracy that are used in application scenarios such as recognition or classification in the industry. Some neural network models may be trained by using a specific training set, to complete a task alone or complete a task in combination with another neural network model (or another function module). Some neural network models may alternatively be directly used to complete a task alone or complete a task in combination with another neural network model (or another function module).

In an embodiment of this application, two different neural network models need to be used for performing the video similarity detection method. One is a neural network model used to perform feature extraction on a to-be-detected video, and is referred to as a feature extraction model. The other is a model used to recognize a type of editing performed on the to-be-detected video compared with the similar video, and is referred to as an editing type recognition model. The feature extraction model and the editing type recognition model may be trained by a training apparatus before being used to detect an editing type of a video. The training apparatus separately trains the feature extraction model and the editing type recognition model by using different training sets. The feature extraction model and the editing type recognition model that are trained by the training apparatus are deployed on the detection apparatus, and the detection apparatus is configured to detect the editing type of the video.

Figure 5:
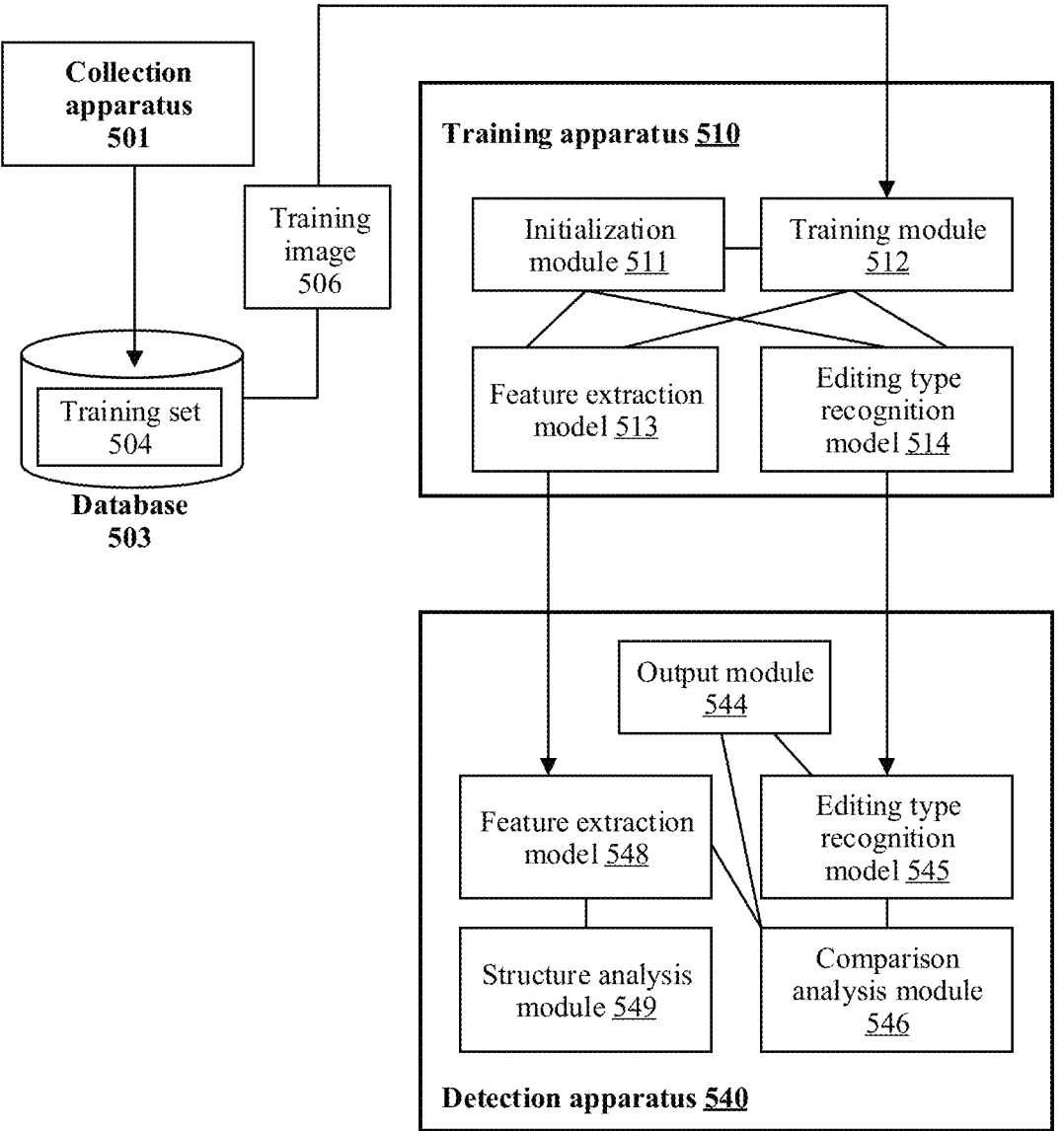
FIG. 5 is a diagram of a training apparatus and a detection apparatus 300 according to an embodiment of this application.

FIG. 5 is a diagram of a training apparatus 510 and a detection apparatus 540. The following describes structures and functions of the training apparatus 510 and the detection apparatus 540 with reference to FIG. 5. It should be understood that this embodiment of this application is merely an example of division of the structures and function modules of the training apparatus 510 and the detection apparatus 540, and the division thereof is not limited in this application.

The training apparatus 510 is configured to separately train a feature extraction model 513 and an editing type recognition model 514. Two different training sets are required to train the feature extraction model 513 and the editing type recognition model 514, and are respectively referred to as a feature extraction training set and an editing type recognition training set. The obtained feature extraction training set 504 and editing type recognition training set 504 are stored in a database 503. A collection apparatus 501 may collect a plurality of training videos or training images, and the plurality of collected training videos or training images are processed and labeled manually or by the collection apparatus 501 to form a training set 504. When the collection apparatus 501 collects a plurality of training videos, the collection apparatus 501 divides shots of each training video, determines key frames in the divided shots, uses the determined key frames as training images, and further processes and labels the training images to construct a training set 504. When the training apparatus 510 starts training the feature extraction model 513, an initialization module 511 first initializes parameters (in other words, assigns an initial value to each parameter) at each layer in the feature extraction model 513. Further, a training module 512 reads a training image 506 in the feature extraction training set 504 in the database 503 to train the feature extraction model 513, until a loss function in the feature extraction model 513 converges or all training images in the feature extraction training set 504 are used for training. In this case, training of the feature extraction model 513 is completed. Similarly, when the training apparatus 510 starts training the editing type recognition model 514, the initialization module 511 first initializes parameters (in other words, assigns an initial value to each parameter) at each layer in the editing type recognition model 514. Further, the training module 512 reads a training image in the editing type recognition training set 504 in the database 503 to train the editing type recognition model 514, until a loss function in the editing type recognition model 514 converges or all training images in the editing type recognition training set 504 are used for training. In this case, training of the editing type recognition model 514 is completed. It should be noted that the feature extraction model 513 and the editing type recognition model 514 may alternatively be separately trained by two training apparatuses, or the feature extraction model 513 or the editing type recognition model 514 or both may not need to be trained by the training apparatus 510. For example, the feature extraction model 513 or the editing type recognition model 514 or both are neural network models that are trained by a third party and have relatively high accuracy for feature extraction or type recognition or both. In an embodiment of this application, alternatively, the collection apparatus 501 may not need to collect the training images or the training videos and construct the feature extraction training set 504 or the editing type recognition training set 504 or both. For example, the feature extraction training set 504 or the editing type recognition training set 504 or both are directly obtained from a third party.

It should be noted that, in this embodiment of this application, a basic feature extraction part of any one of neural network models such as Alexnet, Resnet, Mobilenet, and Densenet may be used as the feature extraction model 513. The loss function used to train the feature extraction model 513 may be a tripletloss function. The feature extraction training set includes two types of image groups. One is labeled as a similar image group, that is, a label of the similar image group is set to "similar", and the other is labeled as a dissimilar image group, that is, a label of the dissimilar image group is set to "dissimilar". A feature extraction training set includes a plurality of similar image groups and a plurality of dissimilar image groups. The similar image group includes two images. One is an original image and the other is a generated image obtained by editing the original image by using one or more editing types (for example, an original image and a generated image rotated and cropped from the original image form a similar image group). Because the generated image is obtained by changing the original image by using one or more editing types, the original image and the generated image have some similar features. The dissimilar image group also includes two (or more) images, and there is no pre-edited and post-edited relationship between the two images. The feature extraction training set is used to train the feature extraction model. The similar image group is used as a positive sample to train the feature extraction model, so that the feature extraction model learns a similar feature of two images in the similar image group. The dissimilar image group is used as a negative sample to train the feature extraction model, so that the feature extraction model is more capable of distinguishing between the similar image group and the dissimilar image group. The feature extraction model trained by using the feature extraction training set can accurately extract a feature in a detected key frame.

It should be noted that, in this embodiment of this application, the editing type recognition training set also includes a plurality of image groups, and each image group includes an original image and a generated image corresponding to the original image. The generated image corresponding to the original image is obtained by performing one or more types of editing operations on the original image. One or more labels are set for each image group, and the labels of each image group are editing types of a generated image in the image group. For example, if an image group includes an original image and a generated image obtained by rotating and cropping the original image, the image group has two labels: rotation and cropping (or labels for other representations corresponding to rotating and cropping). It should be understood that an image in the image group in the editing type recognition training set may be the same as an image in the similar image group in the feature extraction training set. In other words, an obtained training image may be used by both training sets, but a label of the image group in the editing type recognition training set is different from a label of the similar image group in the feature extraction training set. The editing type recognition training set includes image groups of a plurality of types of labels, and there is a plurality of image groups of each type of label. The image groups of each type of label may be single-label image groups (for example, a plurality of image groups whose labels are rotating, where generated images in the plurality of image groups are all obtained by rotating original images) or multi-label image groups (for example, a plurality of image groups whose labels are rotating, cropping, and icon adding, where generated images in the plurality of image groups are all obtained by rotating, cropping, and adding icons on original images). Multi-label cross-entropy may be used as the loss function when the editing type recognition model 514 is trained.

The feature extraction model 513 and the editing type recognition model 514 that are trained by the training apparatus 510 may be respectively used to perform feature extraction and video/image editing type recognition. In an embodiment of this application, as shown in FIG. 5, the trained feature extraction model 513 and the trained editing type recognition model 514 are deployed in the detection apparatus 540. In the detection apparatus 540, the trained feature extraction model 513 is referred to as a feature extraction model 548, and the trained editing type recognition model 514 is referred to as an editing type recognition model 545.

As shown in FIG. 5, the detection apparatus 540 includes a structure analysis module 549, the feature extraction model 548, a comparison analysis module 546, the editing type recognition model 545, and an output module 544.

The structure analysis module 549 is configured to: receive a to-be-detected video (which may be a complete video file or a video clip, for example, a video stream obtained in real time), perform structure analysis on the video, and break the video into one or more shots (or break the video into one or more video clips, and then break each video clip into one or more shots). The structure analysis module 549 is further configured to determine, in each shot, one or more key frames that can represent content of the shot. The structure analysis module 549 outputs a piece of structure data corresponding to a structure of the video, and the structure data represents a location of each shot of the video in the video and locations of the key frames of each shot.

The feature extraction model 548 is connected to the structure analysis module 549 through a communication channel, and is configured to: read the key frames of each shot in the video based on the structure data, perform feature extraction on each key frame, and output a feature of each key frame.

The comparison analysis module 546 is connected to the feature extraction model 548 through a communication channel, and is configured to: query a video library based on the feature corresponding to each key frame to obtain one or more videos similar to the to-be-detected video from the video library. The comparison analysis module 546 is further configured to: determine a similarity between the similar video and the to-be-detected video, and determine a correspondence and a similarity between a similar key frame or shot in the similar video and a corresponding key frame or shot in the to-be-detected video.

The editing type recognition model 545 is connected to the comparison analysis module 546. The editing type recognition model 545 inputs each similar key frame and a corresponding key frame that is in the to-be-detected video to the editing type recognition model 545 based on similar key frames in the similar videos obtained by the comparison analysis module 546. A type of editing between the similar key frame in the similar video and the corresponding key frame in the to-be-detected video is obtained by using the editing type recognition model 545.

The output module 544 is separately connected to the comparison analysis module 546 and the editing type recognition model 545 through a communication channel. The output module 544 outputs the one or more videos that are similar to the to-be-detected video and obtained by the comparison analysis module 546 and the type of editing performed on the similar key frame in the to-be-detected video compared with the corresponding key frame of in each similar video. Optionally, the output module 544 outputs the similarity between the similar video and the to-be-detected video and location information of the key frame or shot that is in the similar video and similar to that in the to-be-detected video.

Both the training apparatus 510 and the detection apparatus 540 may be software apparatuses. When the training apparatus 510 and the detection apparatus 540 are software apparatuses, the training apparatus 510 and the detection apparatus 540 may be deployed on a same computing device (for example, deployed on a same server or on two different virtual machines on a same server). Alternatively, the training apparatus 510 and the detection apparatus 540 may be deployed on different computing devices (for example, the training apparatus 510 is deployed on one or more servers in a cloud environment, and the detection apparatus 540 is deployed on one or more servers in an edge environment). Deployment of the training apparatus 510 is also relatively flexible. In a same manner as the foregoing deployment manner of the detection apparatus, the entire training apparatus 510 may be deployed on a same computing device, or parts of the training apparatus 510 may be separately deployed on different computing devices, and the different computing devices cooperate to run the parts of the training apparatus 510 to implement all functions of the training apparatus 510.

With reference to FIG. 6, the following describes in detail a video similarity detection method according to an embodiment of this application.

S401: Receive a to-be-detected video, and determine a shot and a key frame based on content of the to-be-detected video.

A detection apparatus obtains a video on which editing type detection is to be performed (for example, the detection apparatus receives a to-be-detected video uploaded by a user or an administrator, or the detection apparatus receives, in real time, a video shot by another device), performs structure analysis on the to-be-detected video based on content of the to-be-detected video, and determines shots and a key frame in each shot. A to-be-detected video may include a plurality of shots, and the shot is images, shot by a camera at a time, that have a continuous background. A shot is usually a scene, and image content in the shot may be represented by a key frame.

In this step, the shot may be determined by using a sliding window. A boundary of the shot is determined based on a grayscale histogram difference between adjacent frames in the sliding window. The to-be-detected video is segmented by using the boundary of the shot, and a key frame is selected in each segmented shot based on image content of video frames in the shot. In this step, structure analysis is performed on the to-be-detected video to obtain a piece of structure data corresponding to the video. The structure data may be represented as $\{[s_1, e_1, k_{10}, k_{11}, \ldots], [s_2, e_2, k_{20}, k_{21}, \ldots], \ldots, [s_n, e_n, k_{n0}, k_{n1}, \ldots]\}$. $[s_1, e_1, k_{10}, k_{11}, \ldots]$ in the structure data represents a shot, where $s_1$ is a frame sequence number of a start video frame of the shot in the entire video, $e_1$ is a frame sequence number of an end video frame of the shot in the entire video, and $k_{10}$ is a quantity of offset frames of a key frame relative to the start video frame in the shot.

It should be understood that an implementation of determining the shot and the key frame based on the content of the to-be-detected video is not limited in this application. Different methods may be used to determine shots and key frames in different to-be-detected videos. A solution of determining the shot and the key frame based on the content of the to-be-detected video is described subsequently. In this step, all key frames in the to-be-detected video may be obtained.

It should be noted that, in this step, the shots included in the to-be-detected video are first determined, and then the key frames in the shots are further determined. Optionally, in another embodiment, the key frames may be directly obtained without determining the shots.

S402: A feature extraction model performs feature extraction on the key frame.

Figure 7:
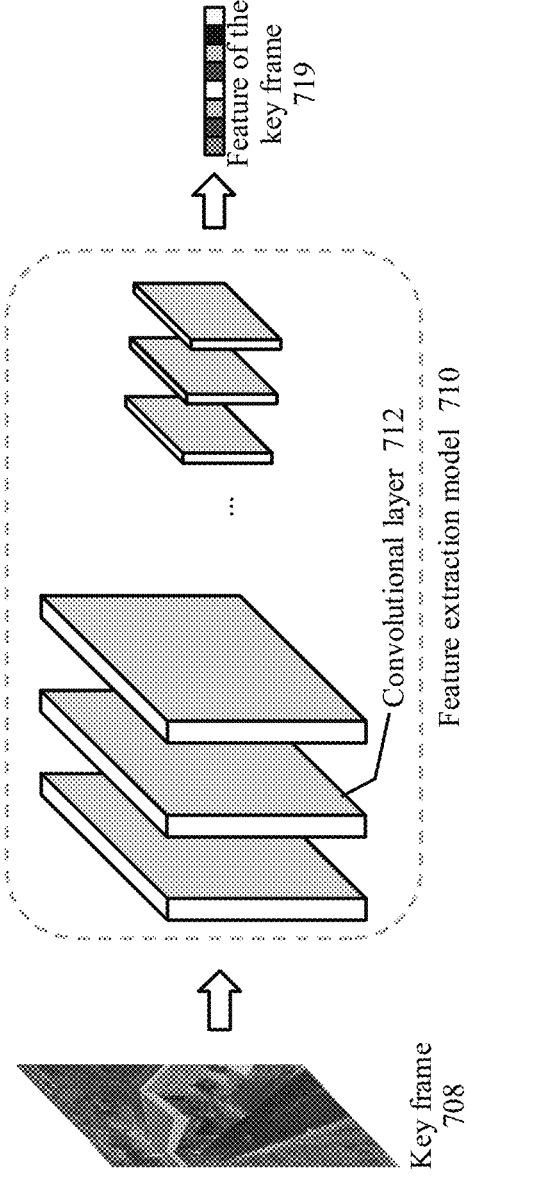
FIG. 7 is a diagram of a feature extraction model according to an embodiment of this application.

The key frame of each shot obtained in step S401 is a two-dimensional image. As shown in FIG. 7, each key frame 708 is input to a trained feature extraction model 710, and the feature extraction model 710 outputs a feature of each key frame 719. The feature of the key frame 719 may be a multidimensional matrix, and the feature of the key frame 719 indicates a feature implied by an image content of the key frame 708. A structure of a neural network model used as the feature extraction model 710 is not limited in this application. The feature extraction model 710 may be a backbone part of a commonly-used neural network model used for image classification or neural network model used for image recognition in the industry, or may be an improved neural network model. The feature extraction model 710 shown in FIG. 7 is a convolutional neural network model. The convolutional neural network model includes a plurality of convolutional layers, each convolutional layer includes one or more convolution kernels, and each convolution kernel includes a plurality of parameters. Each convolution kernel may have a same or different size (for example, a first convolutional layer of the feature extraction model 710 may have 16 convolution kernels whose sizes are all 7×7). After a key frame 708 (or a tensor) is input to a convolutional layer and a convolution operation is performed with each convolution kernel in the convolutional layer, the convolutional layer outputs a tensor. The tensor output by the convolutional layer is a three-dimensional array and includes a plurality of values. For example, a tensor whose scale is W×H×L (where W represents a width of the tensor, H represents a height of the tensor, L represents a quantity of channels of the tensor, and W, H, and L are all natural numbers greater than 0) includes W×H×L values. A quantity of convolution kernels included in a convolutional layer determines a quantity of channels of a tensor output by the convolutional layer. For example, after a tensor whose scale is W×H×L (where W represents a width of the tensor, H represents a height of the tensor, L represents a quantity of channels of the tensor, and W, H, and L are all natural numbers greater than 0) is input to a convolutional layer including J convolution kernels whose sizes are 1×1, convolution is performed with the J 1×1 convolution kernels at the convolutional layer, and a scale of a tensor output by the convolutional layer is W×H×J (where J is a natural number greater than 0). Sizes and quantities of convolution kernels at different convolutional layer may be the same or different. A scale of a tensor output by each convolutional layer is determined by a key frame (or a tensor) input to the convolutional layer, sizes and a quantity of convolution kernels at the convolutional layer, and a convolution calculation manner. After the key frame 708 is input to the feature extraction model 710, a tensor output by a last convolutional layer is used as the feature of the key frame and is output by the feature extraction model 710.

It should be noted that the operation in step S402 is performed on all the key frames in the to-be-detected video obtained in step S401. Therefore, features of all the key frames in the to-be-detected video are obtained in step S402.

S403: Determine, based on the feature of the key frame, a video similar to the to-be-detected video.

The features of all the key frames in the to-be-detected video are obtained in step S402, the feature of each key frame is compared with features of key frames of all videos in a video library, to determine a similar key frame similar to the key frame in the to-be-detected video, and determine a video to which the similar key frame belongs. The video to which the similar key frame belongs is referred to as a similar video, and the similar video is similar to the to-be-detected video. Further, a similarity between the to-be-detected video and the similar video is determined, and a correspondence between and locations of a shot in which the similar key frame is located and a shot in which the corresponding key frame is located are determined.

It should be noted that the video library used in step S403 is a pre-organized and calculated video library, and the video library includes a plurality of videos. A video structure analysis operation same as that in step S401 is performed on each video to determine a shot and a key frame in each video. In other words, each video in the video library corresponds to a piece of structure data, and the structure data indicates a start frame and an end frame of each shot in the video and a key frame in each shot. In this application, a same method as that in step S402 is further performed on each key frame in the video library. Feature extraction is further performed on the key frame of each video in the video library, to obtain a feature of each key frame. Therefore, the video library in this application stores the plurality of videos, the structure data corresponding to each video, and the feature of the key frame in each video.

Sources of the videos in the video library are not limited in this application. When the video library is created, a video may be adaptively collected based on a specific application scenario of the video similarity detection method provided in this application. For example, a film and television work protection department recognize a pirated video by using the video similarity detection method. In this case, the videos in the video library may be existing original film and television works that can be collected. A richer video library indicates a higher probability of obtaining a similar video with high similarity to the to-be-detected video. It should be noted that an operation of performing video structure analysis on the video in the video library to determine the shot and the key frame of the video may be performed at any time before step S403 is performed.

A process of step S403 is described as follows:

S4031: Determine the similar key frame in the video library based on the obtained feature of each key frame in the to-be-detected video.

The feature of each key frame in the to-be-detected video is compared with the features of the key frames of all the videos in the video library, and a comparison method may be calculating similarities one by one. A key frame of a video whose similarity is greater than a preset threshold in the video library is determined as the similar key frame of the compared key frame. A similarity calculation manner is not limited in this application. If there is no similar key frame, in the video library, that is similar to any key frame in the to-be-detected video, editing type detection on the video ends. If there is a similar key frame, in the video library, that is similar to the key frame in the to-be-detected video, a subsequent step is performed. It should be understood that each key frame of the to-be-detected video may have one or more similar key frames in the video library.

S4032: Determine, based on the similar key frame, the similar video similar to the to-be-detected video.

In an implementation, the similar video similar to the to-be-detected video may be determined by using a graph search method.

The key frames in the to-be-detected video are arranged in a time sequence. Each key frame corresponds to all similar key frames, in the video library, that are similar to the key frame. All the key frames in the to-be-detected video and similar key frames corresponding to the key frames may form a graph. The key frames in the to-be-detected video and the corresponding similar key frames are considered as nodes in the graph. Based on the time sequence of the key frames, the similar key frames corresponding to each key frame in the graph are used as nodes to construct a path including each of the similar key frames. Each path includes a plurality of nodes and an edge connecting the nodes. When the path is determined, the nodes are sequentially determined based on the time sequence of the key frames of the to-be-detected video. For each key frame, a found similar key frame corresponding to the key frame is used as a node on a path, and a determined similar key frame and an existing similar key frame on the path belong to a same video. Therefore, nodes on each of a plurality of obtained paths meet a condition: Similar key frames on a same path are in a same video (where if one or more similar key frames corresponding to a key frame do not belong to a same video as existing similar key frames on any path, the key frame is skipped). Therefore, each path corresponds to a video, and the video is referred to as a similar video. A shot of each similar key frame in the similar video is determined based on similar key frames on each path and structure data of a video that corresponds to the path and that is stored in the video library. The shot is referred to as a similar shot of a shot in which a corresponding key frame is located. The similar shot and the shot in which the corresponding key frame in the to-be-detected video is located are referred to as a similar shot pair. Optionally, in a similar shot pair, a similarity between a key frame included in one shot and a similar key frame included in the other shot may be determined as a similarity of the similar shot pair.

A similarity between each similar video and the to-be-detected video is calculated. A similarity between a similar video and the to-be-detected video may be obtained by weighted averaging a similarity of each similar shot pair formed by a shot in the similar video and a shot in the to-be-detected video. Alternatively, a proportion of a sum of duration of shots in which similar key frames are located in the similar video to total duration of the video may be used as the similarity between the similar video and the to-be-detected video.

S404: Input the key frame in the to-be-detected video and the similar key frame in the corresponding similar video to an editing type recognition model, and output an editing type by using the editing type recognition model.

In step S403, the one or more similar videos similar to the to-be-detected video are obtained, and similar key frames in the similar videos are obtained. The similar key frame in each similar video and a key frame in the to-be-detected video corresponding to the similar key frame form a key frame group, and each similar video corresponds to one or more key frame groups. Each key frame group is input to the editing type recognition model. The editing type recognition model outputs one or more editing types existing between the key frame and the similar key frame in the key frame group by performing editing feature extraction and prediction on the similar key frame and the key frame in the key frame group. The one or more editing types existing between the key frame and the similar key frame represent one or more editing types used for editing between the key frame and the similar key frame, and conversion between the key frame and the similar key frame may be implemented through editing by using the one or more editing types. The editing type recognition model sequentially performs editing feature extraction and prediction on each key frame group in each similar video, to obtain a type of editing performed on the similar key frame in the to-be-detected video compared with the corresponding key frame of in each similar video. It should be noted that, because the key frame and the similar key frame are video frames that respectively represent content of a shot in the to-be-detected video and content of a similar shot in the similar video, the one or more editing types existing between the key frame and the similar key frame may be used to represent one or more editing types existing between the shot in which the key frame is located and the corresponding similar shot in the similar video.

Figure 8:
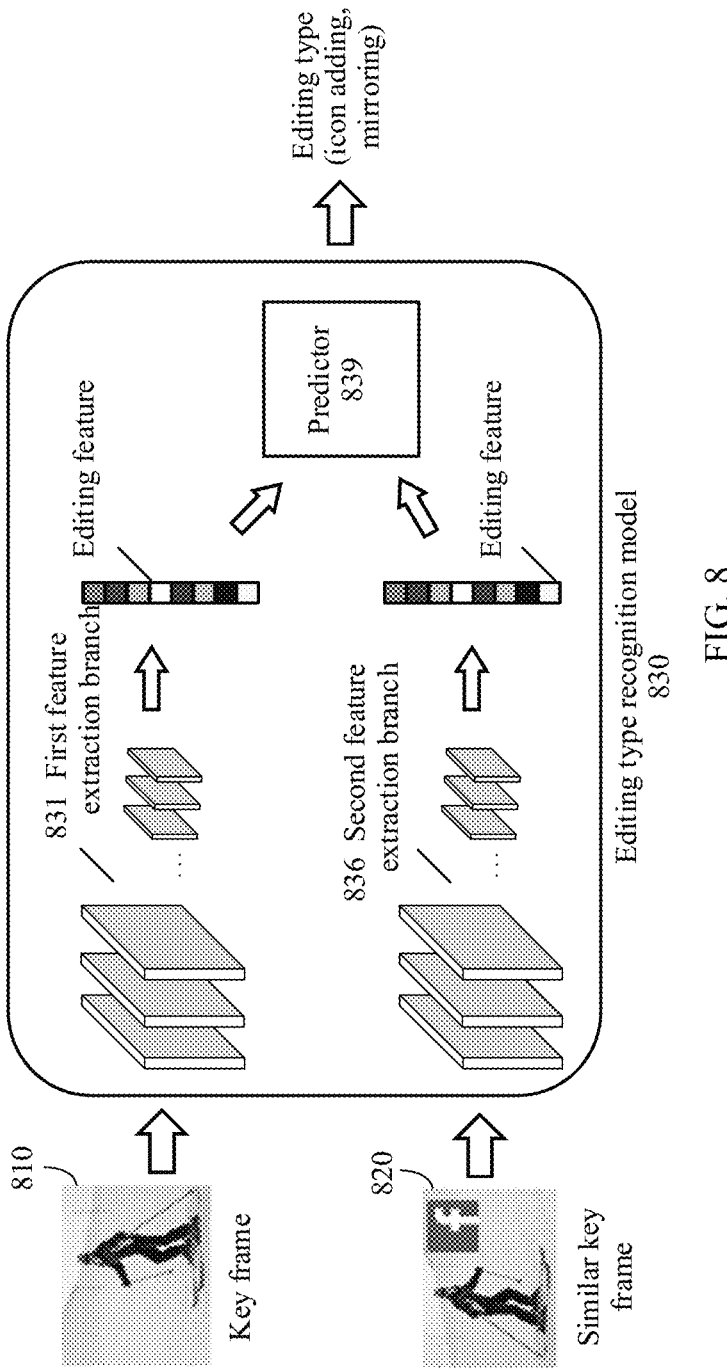
FIG. 8 is a diagram of an editing type recognition model according to an embodiment of this application.

A pre-trained neural network model is used as the editing type recognition model. FIG. 8 is an example of the editing type recognition model 830. The editing type recognition model 830 shown in FIG. 8 includes two feature extraction branches, which are referred to as a first feature extraction branch 831 and a second feature extraction branch 836, and a predictor 839. Outputs of the two feature extraction branches are inputs of the predictor 839, and the predictor 839 is configured to output one or more predicted editing types. The two feature extraction branches in the editing type recognition model 830 are formed by a plurality of same convolutional layers (where quantities of convolutional layers are the same, and parameters at the convolutional layers are the same). The key frame 810 and the similar key frame 820 in the key frame group are respectively input to the first feature extraction branch 831 and the second feature extraction branch 836. The first feature extraction branch 831 performs convolution calculation on the key frame 810, and a last convolutional layer of the first feature extraction branch 831 outputs an editing feature of the key frame 810. The second feature extraction branch 836 performs convolution calculation on the similar key frame 820, and a last convolutional layer of the second feature extraction branch 836 outputs an editing feature of the similar key frame 820. The editing feature of the similar key frame 820 and the editing feature of the key frame 810 are jointly used as inputs of the predictor 839. The predictor 839 performs calculation and prediction, and outputs an editing type existing between the key frame 810 and the similar key frame 820. Based on a relationship between the key frame 810 and the similar key frame 820, the predictor 839 may output one or more editing types.

It should be noted that the one or more editing types output by the predictor 839 of the editing type recognition model 830 represent one or more editing types used for editing between the input key frame 810 and the input similar key frame 820, and also represents one or more editing types used for editing between the shot in which the key frame 810 is located and the similar shot in which the similar key frame 820 is located. If one or more same editing types are obtained by using the editing type recognition model 830 for all key frame groups corresponding to a similar video, the one or more editing types are editing types between the similar video and the to-be-detected video. If editing types obtained by using the editing type recognition model 830 for a plurality of key frame groups corresponding to a similar video are different, all the different editing types are editing types of the similar video relative to the to-be-detected video. For example, there are three key frame groups between the similar video and the to-be-detected video. In other words, there are three similar key frames similar to the key frames of the to-be-detected video in the similar video. Three outputs are obtained for the three key frame groups by using the editing type recognition model 830, and are respectively (rotating, cropping), (icon adding), and (mirroring, cropping). Therefore, the editing types existing between the similar video and the to-be-detected video are (rotating, cropping, icon adding, mirroring).

It should be noted that there may be three cases for the one or more editing types used for editing between the to-be-detected video and the similar video: 1. The to-be-detected video may be obtained by performing editing operations of the one or more editing types on the similar video. 2. The to-be-detected video may be obtained by performing reverse editing operations corresponding to the one or more editing types on the similar video. In other words, editing operations of the one or more editing types may be performed on the to-be-detected video to obtain the similar video. 3. When there is a plurality of obtained editing types, the to-be-detected video may be obtained by performing editing operations of the one or more editing types and reverse editing operations of one or more other editing types on the similar video.

A classification and name of the editing type are not limited in this application. In an editing type division manner, for some editing operations that are reverse operations of each other, for example, icon adding and removing or filter adding and removing, the two editing operations that are reverse operations of each other may be classified into two editing types. For example, icon adding and removing are respectively set to an icon adding editing type and an icon removing editing type. In this editing type division manner, the editing type recognition model 830 may output (1) an editing type used to obtain the to-be-detected video from the similar video, (2) an editing type used to obtain the similar video from the to-be-detected video, or (3) the two editing types that are reverse operations of each other. For some editing operations that do not have reverse operations, there is only one editing type, and the editing type recognition model 830 outputs the editing type, to indicate that the to-be-detected video is obtained by editing the similar video by using the editing type.

The following provides some examples for ease of understanding.

It is assumed that a first video has a first key frame and a third key frame, and a second video has a second key frame and a fourth key frame. A difference between the first key frame and the second key frame lies in that the second key frame has one more icon than the first key frame. In this case, it may be considered that the first video is a source video, the second video is a video generated after an editing operation is performed on the first video (the source video), and an editing type used for editing between the first video and the second video is "icon adding". Alternatively, it may be considered that the second video is a source video, and the first video is a video generated after an editing operation is performed on the second video (the source video). Therefore, an editing type used for editing between the first video and the second video is "icon removing". In other words, because "icon adding" and "icon removing" operations are reverse operations, there may be two detection results, and in the two detection results, roles of the first video and the second video are just reverse. In an actual application, one of the detection results may be output to the user, or both of the detection results may be output to the user. In addition to the editing operation of icon adding (or icon removing), editing operations such as text adding and filter adding all have such a situation.

For another example, it is assumed that a difference between the third key frame and the fourth key frame lies in that the fourth key frame may be obtained after a "mosaic" operation is performed on the third key frame. Different from the operations in the foregoing example, the "mosaic" operation does not have a reverse operation, so that the editing type is unique in this example. Therefore, in this example, the first video is a source video, and the second video is a video generated after an editing operation is performed on the first video (the source video). An editing type used for editing between the first video and the second video is "mosaic", and the editing type recognition model 830 may output the editing type "mosaic".

In another editing type division manner, two editing operations that are reverse operations of each other may alternatively be collectively referred to as one editing type, and a name of the editing type may be represented by only a name of one editing operation in the reverse operations. Alternatively, a name of the editing type can reflect the two editing operations that are reverse operations of each other. In this editing type division manner, if the editing type recognition model 830 outputs the editing type, the to-be-detected video is obtained by using a positive editing operation corresponding to the editing type, or the to-be-detected video is obtained by using a reverse editing operation corresponding to the editing type. For example, the two reverse editing operations of icon adding and icon removing are collectively referred to as one editing type, and a name of the editing type is "icon adding". The key frames of the first video and the key frames of the second video are input to the editing type recognition model 830. If an editing type output by the editing type recognition model 830 is "icon adding", an editing type used for editing between the first video and the second video is "icon adding". There are two possible relationships between the first video and the second video: The second video may be obtained after an icon is added to the first video, or the second video may be obtained after an icon is deleted from the first video.

S405: Output the similar video and the editing type.

The one or more similar videos are obtained in step S403, and the editing type existing between each similar video and the to-be-detected video is obtained in step S404. Each similar video or information about each similar video (for example, a name of the similar video) and the editing type existing between each similar video and the to-be-detected video may be output to a display module. The display module may be a module in the detection apparatus or a module of another apparatus or device other than the detection apparatus. The display apparatus may display, by using a visual interface or in a text manner, each similar video or the information about each similar video and the editing type corresponding to each similar video.

Optionally, the similarity between each similar video and the to-be-detected video may further be output to the display module.

Optionally, a correspondence between a similar shot in each similar video and a corresponding shot in the to-be-detected video may further be output to the display module, and the display module may display the correspondence between the similar video and the to-be-detected video in a plurality of forms.

Optionally, a similarity between a shot in the to-be-detected video and a similar shot in a corresponding similar video may further be output to the display module.

The similar video or the information about the similar video, the type of editing performed on the to-be-detected video compared with the similar video, the similarity between the similar video and the to-be-detected video, the correspondence between the similar shot in the similar video and the corresponding shot in the to-be-detected video, and the similarity between the shot in the to-be-detected video and the similar shot in the corresponding similar video are collectively referred to as related information corresponding to the similar video.

It should be noted that, for the plurality of similar videos obtained in step S403, the similar videos may further be filtered based on similarities of the similar videos, and only related information corresponding to filtered similar videos is output to the display module. For example, the similarity between the similar video and the to-be-detected video is compared with a preset filtering threshold, and only related information corresponding to a similar video whose similarity is greater than or equal to the preset filtering threshold is output to the display module.

The display module may display the obtained information in a plurality of different forms.

FIG. 9 is a diagram in which the display module displays, in a form of a text, the information output by the detection apparatus according to an embodiment of this application. As shown in FIG. 9, the text includes related information corresponding to the top K similar videos that are found in the video library and that have highest similarities to a to-be-detected video Q. The information includes a name of each similar video, a similarity between each similar video and the video Q, a list of similar shots in each similar video, and a list of overall editing types between the similar videos and the video Q. The list of similar shots in each similar video includes information such as start and end frame sequence numbers or time of a shot in the video Q, start and end frame sequence numbers or time of a corresponding similar shot in the similar video, a shot similarity, and a shot editing type. The information in the list of similar shots indicates a correspondence between a similar shot and a corresponding shot in the video Q.

Figure 10:
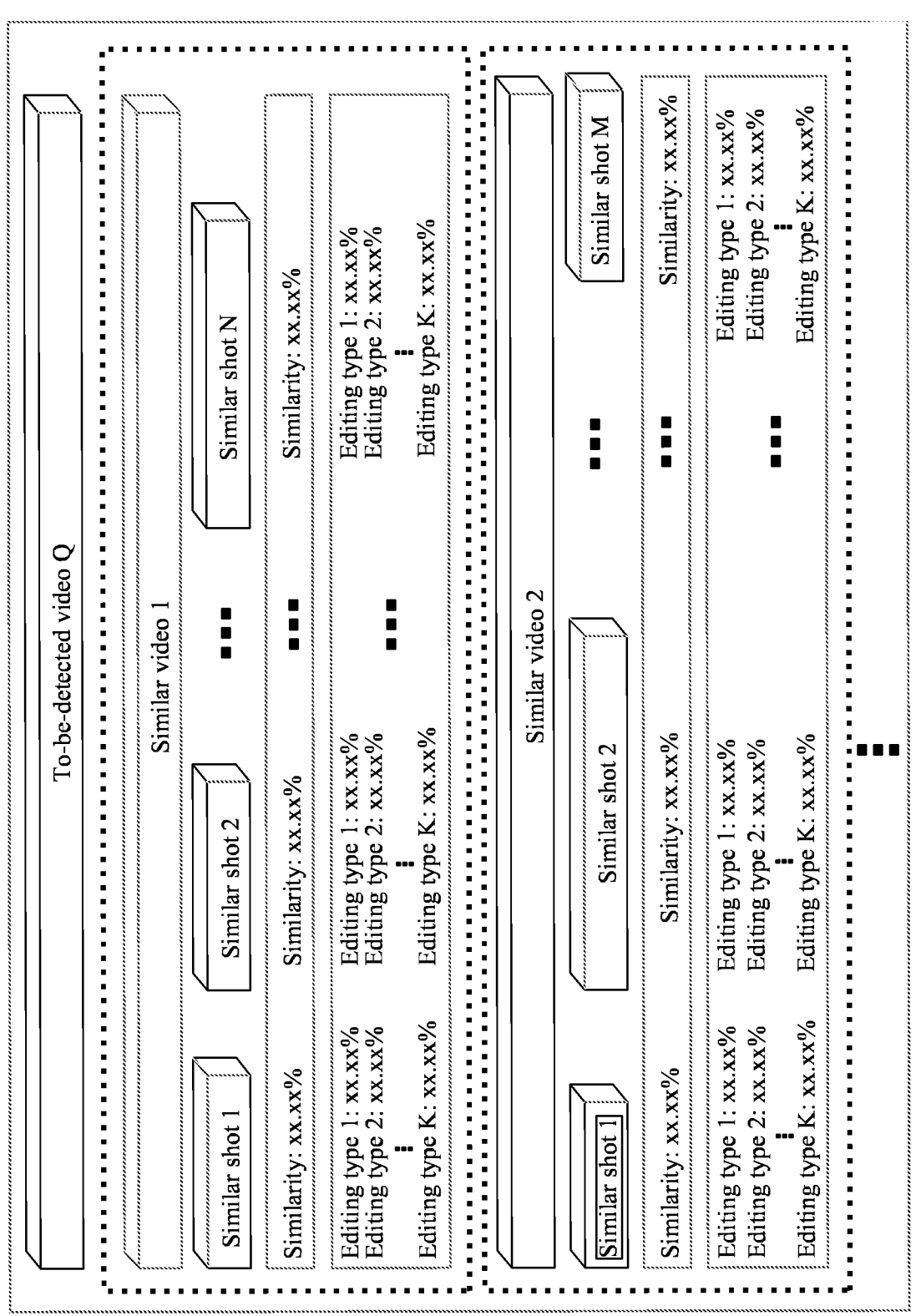
FIG. 10 is a diagram of displaying, in a form of a visual interface, information output by a detection apparatus according to an embodiment of this application.

FIG. 10 is a diagram in which the display module displays, in a form of a visual interface, the information output by the detection apparatus according to another embodiment of this application. As shown in FIG. 10, a to-be-detected video Q, a similar video similar to the video Q, a corresponding similar shot and a similarity of the shot, and an editing type corresponding to each similar shot and a similarity of each shot are displayed on the visual interface.

Optionally, the related information corresponding to the similar video obtained in step S403 and step S404 may alternatively be output to a processing module. The processing module may be a function module in the detection apparatus or a function module in another apparatus or device. The processing module may further process the related information corresponding to the similar video.

Detection of an editing type of the to-be-detected video may be completed by using the method in step S401 to step S405. It should be understood that implementations described in the steps in the foregoing method are merely examples for description, and constitute no limitation on the video similarity detection method provided in this application.

Figure 11:
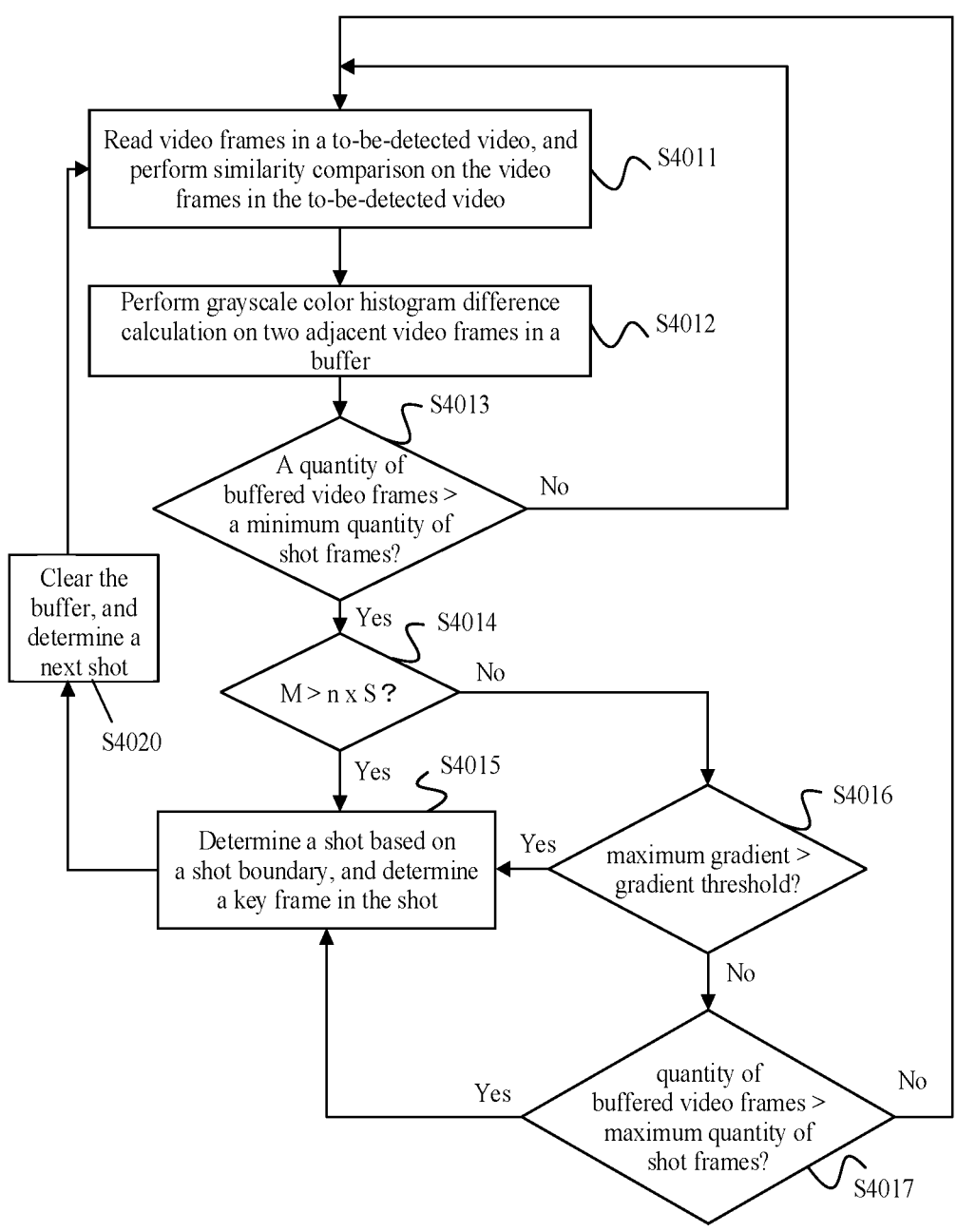
FIG. 11 is a flowchart of a method for determining a shot and a key frame according to an embodiment of this application.

The following describes, with reference to FIG. 11, an implementation of determining the shot and the key frame based on the content of the to-be-detected video in step S401.

S4011: Read video frames in the to-be-detected video, and perform similarity comparison on the video frames in the to-be-detected video.

A first video frame and a second video frame in the to-be-detected video are first read based on the time sequence, and similarity comparison is performed on the second video frame and the first video frame in the two video frames by using an image hash algorithm or another similarity comparison algorithm. If the two frames are similar, a new video frame continues to be read, and similarity comparison is performed on the new video frame and the second video frame in the previous two video frames. Until a new video frame is not similar to the second video frame in previous two video frames, the two different video frames are stored in a buffer.

S4012: Perform grayscale color histogram difference calculation on two adjacent video frames in the buffer.

Grayscale color histograms of the two adjacent video frames are separately calculated, and the grayscale color histograms of the two video frames are correspondingly subtracted, to obtain a grayscale color histogram difference between the two video frames, and the grayscale color histogram difference is stored in the buffer.

S4013: Determine a relationship between a quantity of video frames buffered in the buffer and a preset minimum quantity of shot frames, where when the quantity of video frames buffered in the buffer is greater than the preset minimum quantity of shot frames, step S4014 is performed; otherwise, step S4011 is performed.

S4014: Determine a shot boundary based on a maximum value and an average value of all grayscale color histogram differences in the buffer.

A maximum value M and an average value S of all the grayscale color histogram differences in the buffer are calculated (where M and S are real numbers greater than 0). If $M>n\times S$ (where $0>n\geq1$), the second video frame in two video frames corresponding to the maximum value M of the grayscale color histogram differences is determined as the shot boundary, and step S4015 is performed. If $M\leq n\times S$ (where $0>n\geq1$), step S4016 is performed. It should be noted that a value of n may be preset based on a different application requirement.

S4015: Determine, in the to-be-detected video, a set including a frame following a previously determined shot boundary (or a first frame of the to-be-detected video), a currently determined shot boundary, and all video frames between the frame and the currently determined shot boundary as one shot, and determine a key frame in the shot. A method for determining the key frame is to calculate a grayscale color histogram difference of adjacent video frames in the shot, select video frames whose differences are greater than a preset difference threshold, perform image filtering on the selected video frames, and select a clear video frame with moderate brightness as the key frame.

It should be noted that after step S4015 is completed, at S4020 the buffer is cleared, and execution branches back and step S4011 continues to be performed.

S4016: Calculate gradients of all video frames in the buffer, and compare a maximum gradient with a preset gradient threshold, where if the maximum gradient is greater than the preset threshold, a video frame corresponding to the maximum gradient is determined as a shot boundary, and step S4015 is performed; or if the maximum gradient is less than or equal to the preset gradient threshold, step S4017 is performed.

S4017: Determine a relationship between the quantity of video frames buffered in the buffer and a preset maximum quantity of shot frames, where when the quantity of video frames buffered in the buffer is greater than the preset maximum quantity of shot frames, step S4015 is performed; otherwise, step S4011 is performed.

The foregoing steps are performed based on separate execution conditions. Until all the video frames in the to-be-detected video are processed, execution ends.

It should be noted that, in this application, based on different types of content of the to-be-detected video, different methods may be used to determine the shot and the key frame based on the content of the to-be-detected video. For example, when the to-be-detected video is a video with content such as lectures or variety shows in a same background, the to-be-detected video may be segmented by using fixed duration, and each segmented video clip with the fixed duration is one shot. Then, a key frame is determined in each segmented shot. There are also various methods for determining the key frame. For example, several key frames in the shot may be selected at a fixed video frame interval. Alternatively, edge detection may be performed on each video frame in the shot, and a video frame whose edge is greatly different from an edge of an adjacent video frame is selected as the key frame.

In another embodiment of this application, a video similarity detection method is slightly different from the method described in step S401 to step S405. A trained editing type recognition model 830 may be split into two parts. One part includes the first feature extraction branch and the second feature extraction branch, and the other part includes the predictor. The two parts of the editing type recognition model 830 may be stored at different locations (for example, different virtual machines or different physical computing devices). The operation of performing feature extraction on the key frame and the similar key frame by using the first and second feature extraction branches may be completed before the editing type recognition model 830 performs editing type recognition. For example, in step S403, the first feature extraction branch and the second feature extraction branch may be used to separately extract the editing features of the key frame and the similar key frame, and the obtained editing feature of the key frame and the obtained editing feature of the similar key frame are temporarily stored in a storage module. In step S404, the editing feature of the key frame and the editing feature of the similar key frame in the storage module are input to the predictor, and the predictor outputs the editing type existing between the key frame and the similar key frame.

This application provides the detection apparatus 540 shown in FIG. 5. Modules and functions included in the detection apparatus 540 are described above. Details are not described herein again. In an embodiment, the structure analysis module 549 in the detection apparatus 540 is configured to perform the method described in step S401, the feature extraction model 548 is configured to perform the method described in step S402, the comparison analysis module 546 is configured to perform the method described in step S403, the editing type recognition model 545 is configured to perform the method described in step S404, and the output module 544 is configured to perform the method described in step S405.

This application further provides the computing device 400 shown in FIG. 4. The processor 402 in the computing device 400 reads executable code 407 (included in the detection apparatus) that is stored in the memory 404, to perform the foregoing video similarity detection method.

Figure 12:
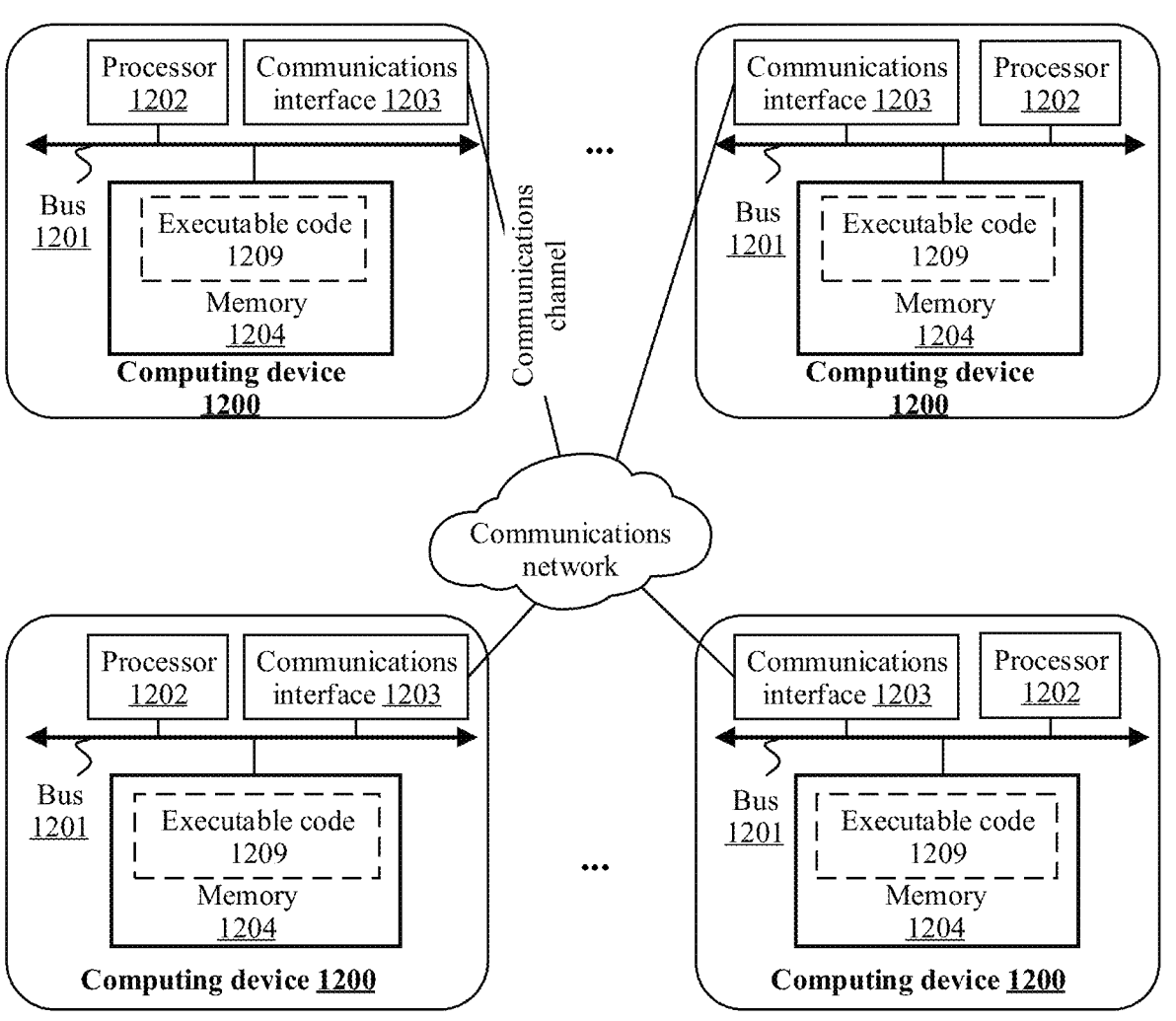
FIG. 12 is a diagram of a computing device system according to an embodiment of this application.

Because the modules in the detection apparatus 540 in this application may be separately deployed on a plurality of computing devices, this application further provides a computing device system shown in FIG. 12. The computing device system includes a plurality of computing devices 1200. Each computing device 1200 includes a bus 1201, a processor 1202, a communications interface 1203, and a memory 1204. The processor 1202, the memory 1204, and the communications interface 1203 communicate with each other through the bus 1201.

The processor 1202 may be a CPU. The memory 1204 may include a volatile memory, for example, a RAM. The memory 1204 may further include a non-volatile memory, for example, a ROM, a flash memory, an HDD, or an SSD. The memory 1204 stores executable code 1209, and the processor 1202 executes the executable code 1209 to perform a part of the video similarity detection method. The memory 1204 may further include another software module, for example, an operating system, for running a process. The operating system may be Linux™, Unix™ Windows™, or the like.

A communications channel is established between the computing devices 1200 through a communications network. Any one or more of the structure analysis module 549, the feature extraction model 548, the comparison analysis module 546, the editing type recognition model 545, and the output module 544 run on each computing device 1200. Any computing device 1200 may be a computing device in a cloud data center, a computing device in an edge data center, or a terminal computing device.

A description of a process corresponding to each of the accompanying drawings has a focus. For a part that is not described in detail in a process, refer to a related description of another process.

All or some of the foregoing embodiments may be implemented through software, hardware, firmware, or any combination thereof. When software is used to implement the embodiments, all or some of the embodiments may be implemented in a form of a computer program product. A computer program product for video similarity detection includes one or more computer instructions for video similarity detection. When the computer program instructions are loaded and executed on a computer, all or some of the processes or functions described in FIG. 6 of the embodiments of the present disclosure are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium stores a readable storage medium of the computer program instructions for video similarity detection. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

What is claimed is:

1. A video similarity detection method, comprising:
   receiving, by a detection apparatus, a first video, and determining a key frame of the first video based on the first video;
   determining, by the detection apparatus, a similar key frame and a second video, the similar key frame being determined based on the key frame, the similar key frame is located in the second video; and
   inputting, by the detection apparatus, the key frame and the similar key frame to an editing type recognition model to obtain an editing type, the editing type recognition model is used to obtain the editing type for editing between the key frame and the similar key frame, conversion between the key frame and the similar key frame is implemented through editing by using the editing type, the editing type comprises one or more of: cropping, stitching, rotating, mirroring, blurring, text adding, icon adding, color changing, brightness changing, or contrast changing.

2. The method according to claim 1, the method further comprising:
   outputting, by the detection apparatus, the second video or information about the second video to a display, the information about the second video comprising a name of the second video; and
   outputting, by the detection apparatus, the editing type to the display.

3. The method according to claim 1, wherein the editing type recognition model comprises a first feature extraction branch, a second feature extraction branch, and a predictor, and the inputting the key frame and the similar key frame to the editing type recognition model to obtain the editing type comprises:
   inputting, by the detection apparatus, the key frame to the first feature extraction branch, and inputting the similar key frame to the second feature extraction branch;
   performing, by the first feature extraction branch, feature extraction on the key frame, and outputting an editing feature of the key frame;
   performing, by the second feature extraction branch, feature extraction on the similar key frame, and outputting an editing feature of the similar key frame; and
   inputting, by the detection apparatus, the editing feature of the key frame and the editing feature of the similar key frame to the predictor, and outputting, by the predictor, the editing type.

4. The method according to claim 1, the method further comprising:
   inputting, by the detection apparatus, the key frame into the editing type recognition model;
   receiving, by the detection apparatus, an editing feature of the key frame from the editing type recognition model;
   inputting, by the detection apparatus, the similar key frame into the editing type recognition model;

receiving, by the detection apparatus, a similar key editing feature of the similar key frame from the editing type recognition model;
obtaining, by the detection apparatus, the editing type based on the editing feature of the key frame and the similar key editing feature of the similar key frame.

5. The method according to claim 1, wherein the method further comprises:
   calculating, by the detection apparatus, a similarity between the first video and the second video; and
   outputting, by the detection apparatus, the similarity to the display.

6. The method according to claim 1, wherein the determining the similar key frame and the second video based on the key frame comprises:
   querying, by the detection apparatus, a video library based on the key frame to obtain the similar key frame from the video library; and
   determining, by the detection apparatus, the second video based on the similar key frame.

7. The method according to claim 1, wherein the editing type recognition model is based on a neural network model.

8. A detection apparatus, comprising:
   a communications interface;
   a non-transitory memory storing instructions; and
   at least one processor in communication with the communications interface and the memory, the at least one processor configured, upon execution of the instructions, to perform the following steps:
   receive a first video, and determine a key frame of the first video based on the first video;
   determine a similar key frame and a second video, the similar key frame being determined based on the key frame, the similar key frame is located in the second video; and
   obtain an editing type based on the key frame and the similar key frame, conversion between the key frame and the similar key frame is implemented through editing by using the editing type, the editing type comprises one or more of: cropping, stitching, rotating, mirroring, blurring, text adding, icon adding, color changing, brightness changing, or contrast changing.

9. The apparatus according to claim 8, the at least one processor further executing the instructions to:
   output the second video or information about the second video to a display, the information about the second video comprising a name of the second video; and
   output the editing type to the display.

10. The apparatus according to claim 8, the at least one processor further executing the instructions to:
    receive the key frame;
    perform feature extraction on the key frame;
    output an editing feature of the key frame;
    receive the similar key frame;
    perform feature extraction on the similar key frame;
    output an editing feature of the similar key frame; and
    obtain the editing type based on the editing feature of the key frame and the editing feature of the similar key frame.

11. The apparatus according to claim 8, the at least one processor further executing the instructions to:
    input the key frame to the first feature extraction branch and input the similar key frame to the second feature extraction branch;
    perform feature extraction on the key frame and output an editing feature of the key frame;

perform feature extraction on the similar key frame and output a similar key frame editing feature of the similar key frame; and input the editing feature of the key frame and the editing feature of the similar key frame to the predictor, and output, by the predictor, the editing type.

12. The apparatus according to claim 8, the at least one processor further executing the instructions to:

calculate a similarity between the first video and the second video; and output the similarity to the display.

13. The apparatus according to claim 8, the at least one processor further executing the instructions to:

query a video library based on the key frame to obtain the similar key frame from the video library; and determine the second video based on the similar key frame.

14. The apparatus according to claim 8, wherein the editing type recognition model is based on a neural network model.

15. A non-transitory computer-readable media storing computer instructions for video similarity detection, that when executed by one or more processors, cause the one or more processors to perform the steps of:

receiving a first video and determining a key frame of the first video based on the first video;

determining a similar key frame and a second video, the similar key frame being determined based on the key frame, the similar key frame is located in the second video; and inputting the key frame and the similar key frame to an editing type recognition model to obtain an editing type, the editing type recognition model is used to obtain the editing type for editing between the key frame and the similar key frame, conversion between the key frame and the similar key frame is implemented through editing by using the editing type, the editing type comprises one or more of: cropping, stitching, rotating, mirroring, blurring, text adding, icon adding, color changing, brightness changing, or contrast changing.

* * * * *